United States Patent Office
2,962,420
Patented Nov. 29, 1960

2,962,420

METHOD OF INHIBITING PERSPIRATION AND COMPOSITIONS THEREFOR

Adolph Rostenberg, Jr., Chicago, Ill., assignor to The University of Illinois Foundation, Urbana, Ill., a corporation of Illinois No Drawing. Filed July 16, 1957, Ser. No. 672,112

3 Claims. (Cl. 167—90)

This invention relates to a method of inhibiting perspiration and compositions suitable for that purpose.

It has been known for some time that malonate ions inhibit the action of the enzyme succinic dehydrogenase. It has been shown that activity of the sweat glands, particularly the eccrine glands, is characterized by the presence of succinic dehydrogenase. I have now discovered that topical application of the malonate ion in available form has an inhibiting effect upon perspiration.

It is preferred to employ the sodium salt of malonic acid as the active agent. The vehicle may take any suitable form for surface application. In practice I have found it convenient to employ a conventional cold cream base or vanishing cream. However, the material has also been applied in aqueous solution, and may be applied in other carriers.

The proportion of malonic ion required may be varied over a rather wide range. 5% to 20% of sodium malonate has been employed successfully in a grease base. For normal purposes a 5% content is sufficient, but the higher proportions provide a reserve supply of material of the malonate.

The following is an example of the invention in parts by weight:

*Example I*

| | Parts |
|---|---|
| Sodium malonate | 5 |
| Cold cream base | 95 |

*Example II*

| | Percent by weight |
|---|---|
| Sodium malonate | 20 |
| Cold cream base | 80 |

The cold cream base may be:

| | Parts |
|---|---|
| Cetyl alcohol | 1500 |
| Stearyl alcohol | 1500 |
| White petrolatum | 1500 |
| Sodium lauryl sulfate | 150 |
| Propylene glycol | 1500 |
| Methyl p. hydroxy benzoate | 15 |
| Distilled water | 8835 |

In place of the base shown in Example II any conventional washable cream base may be substituted. I have also used compositions including approximately 10 and 15 parts by weight of sodium malonate.

The malonate may be combined with perspiration inhibitors of the astringent type.

The cream base may be replaced by other carriers including water.

The amount of malonate should be at least one percent.

The foregoing detailed description has been given for clearness of understanding only, and no unnecessary limitations should be understood therefrom, as modifications will be obvious to those skilled in the art.

I claim:

1. The method of inhibiting perspiration which comprises applying to the skin area to be affected a compound yielding malonate ions capable of inhibiting the action of the enzyme succinic acid dehydrogenase.

2. The method as set forth in claim 1 in which the compound includes sodium malonate.

3. The method as set forth in claim 1 in which the compound includes an alkali metal malonate.

References Cited in the file of this patent

UNITED STATES PATENTS 2,294,140    Taylor _____ Aug. 25, 1942

OTHER REFERENCES

Colowick: Methods in Enzymology, vol. 1, 1955, Academic Press Inc., N.Y., pp. 727–729.

Klarmann: J. Soc. Cos. Chem., vol. 7, No. 2, March 1956, p. 101.

Waksman: Microbial Antagonists and Antibiotic Substances, The Commonwealth Fund, N.Y., 1945, p. 199.

Lobitz: Arch. Dermat., vol. 72, No. 3, September 1955, pp. 229–236.